Oct. 17, 1961 A. R. HAYES 3,004,271
TAPPING TOOL SPINDLE ADAPTED FOR SUPPORT IN SPACED JOURNALS
Original Filed April 27, 1959

INVENTOR.
AUGUST R. HAYES
BY William A. Murray
ATTORNEY

United States Patent Office 3,004,271
Patented Oct. 17, 1961

3,004,271
TAPPING TOOL SPINDLE ADAPTED FOR
SUPPORT IN SPACED JOURNALS
August R. Hayes, Rock Island, Ill., assignor to Moline
Tool Company, Moline, Ill., a corporation of Illinois
Continuation of application Ser. No. 808,991, Apr. 27,
1959. This application Feb. 14, 1961, Ser. No. 90,159
5 Claims. (Cl. 10—129)

This invention relates to a tapping machine and particularly to a tool mounting assembly for a tap used in a tapping machine which taps a plurality of openings in the same operation.

This is a continuation of a previously filed application Serial No. 808,991 filed April 27, 1959, and now abandoned.

There is always the problem when tapping a plurality of drilled openings in the same operation of providing sufficient safety devices in the machine or tool mounting assembly to compensate in one instance for a condition in which an opening was not pre-drilled prior to tapping, and in the second instance for a condition in which the opening has been pre-drilled to an insufficient depth to accommodate the full tapping cycle. There are, of course, several mounting attachments for mounting tapping tools which compensate to a limited extent for the above conditions. However, most of such attachments are quite cumbersome and generally include large additional structures for supporting the tapping tools on the basic drilling and tapping machine. As a result, not only are such attachments considerably expensive, but they are generally of such large size that the working space in the machine is considerably reduced.

It is the main object of this invention to provide a self-contained tapping tool mounting assembly of a new and novel nature which may be inserted in the basic drilling and tapping machine and which is provided with a simple mounting means as well as a simple drive connection to the driving elements of the machine.

It is a further object of this invention to incorporate in the tapping tool assembly safety features which will prevent injury or breakage in one instance of the tap or other portions of the assembly should the tap be forced against a surface not pre-drilled, and in a second instance to permit breakage of the tap but not other portions of the assembly should the tap be inserted in a drilled opening of insufficient depth to accommodate the tap for the full tapping cycle. Other safety features in the mounting structure for the assembly are provided should basic mechanism of the machine fail to function properly.

Other objects and advantages of the invention will become apparent to those skilled in the art as the nature of the invention is better understood from the following disclosure and as shown in the accompanying drawings.

Figure 1:
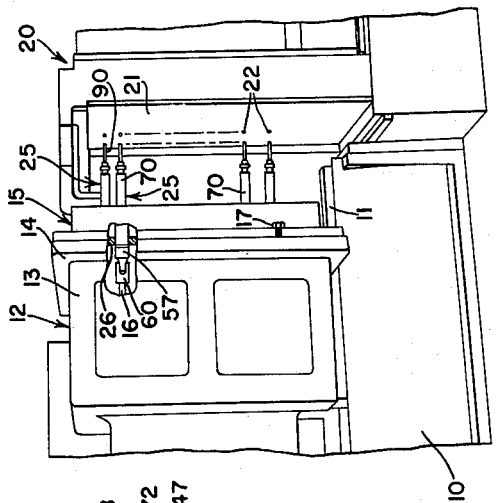
FIGURE 1 is a front perspective view of the central working portion of a horizontal drilling and tapping machine incorporating the tapping tool assembly of the present invention. Portions of the machine are broken away to show internal mechanism.

Referring to FIGURE 1, there is shown a horizontal feed drilling and tapping machine composed of a main support or base 10 having upwardly facing horizontal guides or ways 11 on which may be moved a head 12 having drive mechanism, not shown, but contained within the main head housing 13 and generally terminating in a plurality of drive shafts, one of which is shown at 16. The head housing 13 has an inwardly facing peripheral flange 14 on which is bolted, as at 17, a main tool support 15 in the present instance of the type referred to within the industry as a "slip spindle plate" support.

The head 12 may be moved along the ways 11 toward a work-holding fixture 20 in which is clamped the drilled material or part, here shown as an upright plate 27 with drilled openings 22. The exact means or method of moving the head 12 toward the fixture 20 as well as the driving mechanism for operating the drilling and tapping mechanisms are unimportant for purposes of the present invention. Generally, such are of conventional type and are of a type well known within the industry.

Referring again to the head 12, there are therein provided a plurality of tapping tool assemblies, each indicated in its entirety by the reference numeral 25. The number of assemblies used on a machine is, of course, dependent upon the type of work for which they are to be used. In the normal drilling and tapping processes, there are provided several pieces of material, each to be drilled at specific locations. Following drilling, the drill assemblies are replaced in the "slip spindle plate" or support 15 by tapping tool assemblies 25. In this manner alinement of the tapping tools with the drilled holes 22 is provided.

Figure 2:
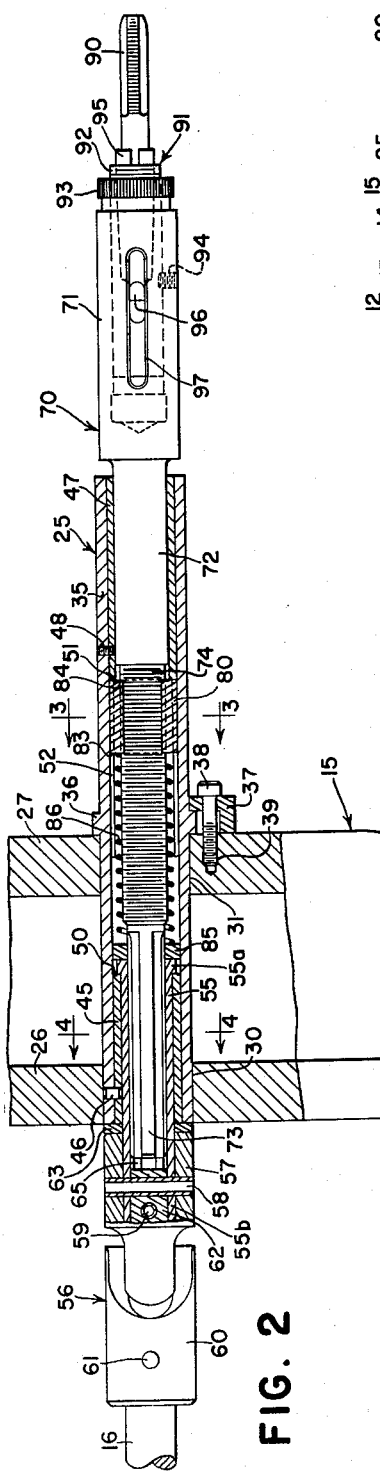
FIGURE 2 is a horizontal sectional view of one of the tapping tool mounting assemblies and a portion of its supporting structure.

Referring to FIGURE 2, the "slip spindle plate" or support 15 is composed of a pair of upright and spaced apart parallel walls 26, 27 which are formulated into a common flange 28 at their outer edges which lies adjacent the flange 14. The flange 28 is provided with openings 29 which receives the aforementioned bolts 17. The walls 26, 27 are provided with axially alined openings 30, 31 respectively through which the tool assembly 25 may be inserted.

The tapping tool assembly 25 is composed in part of a rigid elongated casing or support sleeve 35 having an inner or first end projecting through the opening 30, 31 and an outer end projecting outwardly of the support 15 toward the material to be tapped. The casing 35 is provided with an integral radial outer collar or abutment 36 having a radial surface abutting against the wall 27. The collar 36 is held against the wall 27 by a clamping bracket 37, the latter being adjustably tightened against the radial surface of the collar 36 by an adjusting screw 38. The collar 36, when so clamped, prevents both axial and radial movement of the casing 35. A tapped hole 39 is in the wall 27 for receiving the screw 38. As will later become apparent, the clamping bracket operates as a slip lock generally preventing axial movement of the casing 35 but permitting rotation of the casing upon excessive force or torque being applied to the casing.

An internal journal or bushing 45 is provided on the inner end of the casing 35 and is held against movement by means of a set screw 46. A second internal journal or bushing 47 is provided in the opposite or outer end of the casing 35 and is held against movement by a set screw 48. The journals 45, 47 are terminated inwardly of the respective ends of the casing at radial shoulders 50, 51. A mid-portion of the casing 35 is provided with internal guide means or teeth 52 running axially or lengthwise of the casing.

A rotatably driven member or drive shaft 55 is disposed in the inner end of the casing 35 and extends through the walls 26. It has its external surface journalled in the bushing 45. The sleeve 55 extends axially beyond the inner end of the casing 35 and has its projecting portion 55b extending into and adapted for connection to a universal or articulate joint 56, one portion 57 of which is pinned at 58, 59 to the sleeve section 55b and the other portion 60 of which is pinned at 61 to the drive shaft 16. Often the shaft 16 will be at an angle to axis of the shaft 55, and consequently the articulate connection will permit such without affecting the drive relation between the two. An end plug 62 is provided to add strength at end 55b of the sleeve. A thrust washer 63 is disposed between the end of the casing 35 and the universal joint section 57. The sleeve 55 is provided with an integral radial collar 55a which seats behind the shoulder 50 to limit axial movement of the sleeve. The internal surface of the sleeve 55 is splined at 65.

An elongated spindle 70 is disposed within the casing and has an adapter end 71 projecting beyond the outer end of the casing, a portion 72 journalled in the journal 47, a splined end 73 carried in the splined inner surface 65 of the drive sleeve and a threaded mid-portion 74 between the portions 72, 73. The threaded mid-portion 74 is spaced radially inwardly of the axial teeth 52. The splined end 65 of the sleeve 55 and the splined end 73 of the spindle function as connecting means between the sleeve 55 and spindle 70 effective to cause rotation thereof in unison, but permitting relative axial movement between the sleeve 55 and spindle 70.

A nut or radial element 80 is positioned in the space between the threaded portion 74 and the teeth 52, the nut 80 being internally threaded at 81 on its inner axial face to mount on the threaded portion 74. The nut has external axial teeth 82 on its outer axial face which engage the teeth 52. As may readily be seen, therefore, the nut is permitted axial movement but is restricted against angular movement relative to the casing 35. The nut element has axially spaced radial faces 83, 84. The face 84 abuts against the shoulder 51 of the journal sleeve 47. Spring or biasing means in the form of a collar 85 and compression spring 86 extends between the face 83 and the end of the sleeve 55. The spring 86 biases the nut against axial movement away from the shoulder 51.

The tool mounting means for a tap 90 is of conventional type. The adapter end 71 of the spindle 70 is provided with an axial opening in which is inserted an adapter 91, the outer end of which is threaded, as at 92, to receive an adjusting collar 93. The collar 93 normally abuts the end of the spindle 70 and provides accurate axial positioning of the adapter 91 relative to the spindle 70. A set screw 94 is provided to lock the adapter 91 in the adapter end 71 of the spindle 70. Contained within the adapter 91 is a conventional type pair of tap drivers or jaws 95 which snugly engage the shank end of the tap 90. The tang end 96 of the driver 95 may be seen through a slot 97 in the end portion 71 of the spindle 70. A tool may be inserted through the slot 97 for purposes of engaging the tang end 96 and knocking the drivers 95 and tap 90 out of the adapter 91.

The invention operates in the following manner. Assuming that the work or material 21 has been drilled substantially as shown at 22, the entire drill assembly is removed at the location of the universal joint 56 by removing a suitable pin in the joint, the exact connecting pin being unimportant. However, it should be recognized that it is oftentimes the normal procedure to connect the drill assembly to the shaft at a point behind the wall 26. The drill assembly is slipped out of the "slip spindle plate" 15 via the openings 30, 31, and the entire tapping tool assembly 25 is inserted through the same openings and is connected to the drive element or shaft 16 through the universal joint 56. Here it should be recognized that the diameter of the drive sleeve 55 as well as the sections 57, 60 of the universal joint 56 is such as to permit movement through the openings 30, 31.

In initial operation of the unit, the head 12 is brought to a position whereby the taps 90 are proximate the work or material 21 and in alinement with the drilled holes 22. The drive shafts 16 are then driven and the drive sleeve 55 causes the spindle 70 to rotate.

The spring 86 is of such force to cause the nut element 80 to abut against the shoulder 51. Therefore, as the spindle rotates, the spindle is fed axially outwardly by the nut element 80. It should be here understood that the teeth on the tap 90 have the same pitch as the threaded central portion 74 of the spindle. Consequently, the spindle is fed outwardly at the same rate required by the tapping tool 90. Obviously, of course, once the tapping action has begun the tap 90 will exert force on the spindle to feed at the correct rate.

Should one of the taps 90 encounter an obstruction which prevents tapping, such as would occur should the tapping tool assembly be brought against the material 21 at a point which has not been predrilled, the spindle 70 is fed through the casing 35 on the nut element 80 until the tap 90 contacts the undrilled material 21. Upon contact with the material, further rotation will cause the nut element 80 to be fed axially inwardly by the threaded portion 74 of the spindle. The spring 86 will be compressed and the nut will move to substantially the position shown in FIGURE 5.

As the respective shaft 16 is reversed in direction of rotation for the normal purpose of removing the tap from its opening, the spring 86 will cause the nut element to be threaded axially outwardly along the threaded portion 74 of the spindle 70 and back into an abutting position with the shoulder 51 or as shown substantially in FIGURE 2. Therefore, there is built into the present tapping tool assembly 25 a safety feature protecting the tap as well as the entire tool assembly from injury should the tap encounter an obstruction which prevents a tapping operation.

In the normal drilling operation there occur instances in which the drilled openings are not of the proper depth. As a consequence, the tap 90 will begin its tapping operation but will reach the end of the opening prior to the normal completion of the tapping cycle where it will be held against further rotation. The drive shaft will continue to apply torque to the tap which will cause breakage of the tap. The spindle 70 and broken portion of the tap will continue to rotate and will force the nut 74 axially inwardly much in the same manner as when the tap strikes a surface which is not pre-drilled. As a consequence the tap will be broken, but the more expensive mounting assembly will not be harmed.

Figure 5:
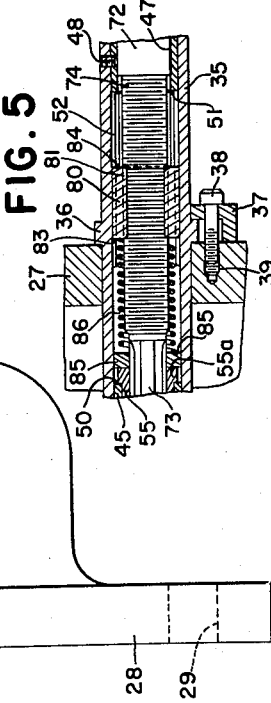
FIGURE 5 is a horizontal sectional view of a portion of the tapping tool assembly showing a different position of the parts.
Figure 3:
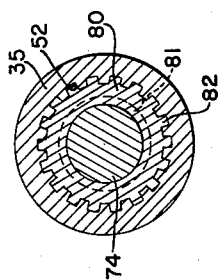
FIGURE 3 is a sectional view taken substantially along the line 3—3 of FIGURE 2.
Figure 4:
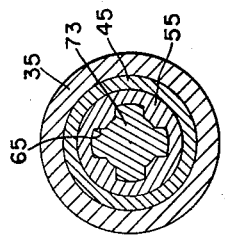
FIGURE 4 is a sectional view taken substantially along the line 4—4 of FIGURE 2.

The adjustable clamp means 37, 38 operates to prevent injury to the mounting assembly 25 due to malfunction of the assembly or of the machine. For example, should for some reason the nut 74 become locked or frozen to the spindle and casing and not properly feed out the spindle, then operation of the drive shaft 16 will apply torque to the entire assembly as a unit. Or as a further example, should the drive shaft 16 not shut off at the end of a cycle combined with the nut element 80 being at its maximum axial position, as shown in FIGURE 5, then the torque will again be applied to the unit as a whole. In either example, upon sufficient torque being applied, the clamp means 37, 38 will permit the casing to rotate in the openings 30, 31 prior to damage being done to the tool mounting assembly. Therefore, the present assembly adds further protection of a basic safety feature preventing breakage or damage to the assembly due to improper functioning of the machine or assembly.

While only one form of the invention has been shown, it should be recognized that other forms will occur to those skilled in the art. It should therefore be understood that the present form was shown and described in detail for the purpose of clearly and concisely illustrating the principles of the invention, and it is not the intention by so describing it to narrow or limit the invention beyond the broad concept as set forth in each of the appended claims.

What is claimed is:

1. A tapping tool assembly adapted for mounting in two rigidly joined and spaced-apart walls disposed between a drive mechanism and material to be tapped, said walls being characterized by having a pair of alined openings, said tapping tool assembly comprising: an elongated rigid casing extending through the openings and supported by the walls and having means thereon for preventing rotational and axial movement, said casing having an inner end adjacent the drive mechanism and an outer end adjacent the material; a first journal in the casing adjacent the inner end; a drive member projecting into and journaled in said first journal so as to normally extend through at least one of the walls when the assembly is mounted thereon, said member having an end outside of the casing adapted for an articulate connection to the drive mechanism to effect rotation thereof and an end within the casing; means fixing the drive member against axial movement relative to the casing; a second journal adjacent the outer end of the casing, an elongated spindle journaled in said second journal and having an end portion within the casing in telescoping and driving relation with the end of the drive member for effecting rotation of the member and spindle in unison, said casing and spindle having radially spaced adjacent portions; a radial element having axial surfaces disposed in the space between said adjacent portions, the radial element being threaded on one of said axial surfaces and having axial guide means on the other of said axial surfaces, one of said adjacent portions being threaded to accommodate the threaded surface of the radial element, the other of said adjacent portions having means accommodating said axial guide means whereby said radial element may move axially relative to that adjacent portion; means biasing the radial element axially toward the outer end of the casing; and tool adapting means on the outer end portion of the spindle for attaching a tap thereto.

2. A tool mounting assembly for a tap of a given pitch and adapted for insertion in a pair of alined openings in a two-wall slip spindle plate, comprising: an elongated rigid casing having an outer peripheral surface insertable axially in the openings with means thereon preventing rotational and axial movement relative to both walls, the casing further having between the inner and outer ends thereof an internal surface with axially extending guide means; a rotatable drive member journaled in the inner end of the casing so as to normally extend through at least one of said two walls when the assembly is mounted therein and having an axial opening therein; said member having an end outside of the inner end of the casing adapted for articulate connection to a drive element; means fixing said drive member against axial movement relative to the casing; an elongated spindle journaled in the outer end of the casing and having one end portion thereof projecting beyond the outer end of the casing, and a threaded portion having a thread pitch of the tap and radially spaced from and internally of the axial guide means on the internal surface of the casing, said spindle further having an inner end insertable in the axial opening of the drive member for connecting said spindle to said drive member and effecting rotation of the member and spindle in unison, but effective to permit relative axial movement between the member and spindle; a nut element internally threaded to mount on the threaded portion of the spindle and having an outer surface engageable with said axial guide means whereby said nut element may move axially relative to the casing; means biasing the nut element axially toward the outer end of the casing; and an adapter on the outer end of the spindle connecting the tap to the spindle.

3. The invention defined in claim 1 further characterized by the axial guide means being on the internal surface of the casing and only partially through the thickness of the casing wall whereby the radial element and the adjacent portion of the spindle are completely enclosed.

4. The invention defined in claim 2 in which the drive member and spindle are journaled in the casing by axially spaced journals at its inner and outer ends respectively so that the spindle is directly journaled in the journal adjacent the outer end, and the drive member is directly journaled in the journal at the inner end and the axial opening in the drive member accommodates the end of the spindle internally of the casing for axial movement while preventing relative radial movement between the spindle and drive member whereby the drive member and its respective supporting journal at the inner end of the casing will indirectly support said inner end of the spindle.

5. The invention defined in claim 4 further characterized by the journal at the inner end being rigid with the casing and providing a radial shoulder within the casing facing said nut element, and the biasing means is in the form of a coil spring surrounding the spindle and disposed between the element and the respective radial shoulder of the inner journal.

References Cited in the file of this patent

UNITED STATES PATENTS

| 1,781,109 | Herzberg | Nov. 11, 1930 |
| 2,405,718 | Schafer | Aug. 13, 1946 |